No. 765,411. PATENTED JULY 19, 1904.
L. J. ALVORD.
KETTLE.
APPLICATION FILED DEC. 4, 1903.
NO MODEL.

Witnesses

Inventor
L. J. Alvord
By
Attorneys

No. 765,411. Patented July 19, 1904.

UNITED STATES PATENT OFFICE.

LILLIE J. ALVORD, OF BEDFORD, IOWA.

KETTLE.

SPECIFICATION forming part of Letters Patent No. 765,411, dated July 19, 1904.

Application filed December 4, 1903. Serial No. 183,753. (No model.)

*To all whom it may concern:*

Be it known that I, LILLIE J. ALVORD, a citizen of the United States, residing at Bedford, in the county of Taylor, State of Iowa, have invented certain new and useful Improvements in Kettles; and I do hereby declare the following to be a full, clear, and exact description of the invention, such as will enable others skilled in the art to which it appertains to make and use the same.

This invention relates to kettles for cooking; and it has for its object to provide a kettle which will be especially valuable in preserving in that the bodies to be preserved are supported or held out of contact with the kettle proper, so that burning or scorching is prevented and also so that breaking or disintegration of the body is prevented.

A further object of the invention is to provide a construction wherein the juice or liquor will serve as a water-jacket about the more solid matter and in which sticking of the juice or liquor to the bottom of the kettle proper will be prevented.

Other objects and advantages of the invention will be understood from the following description.

Figure 1:
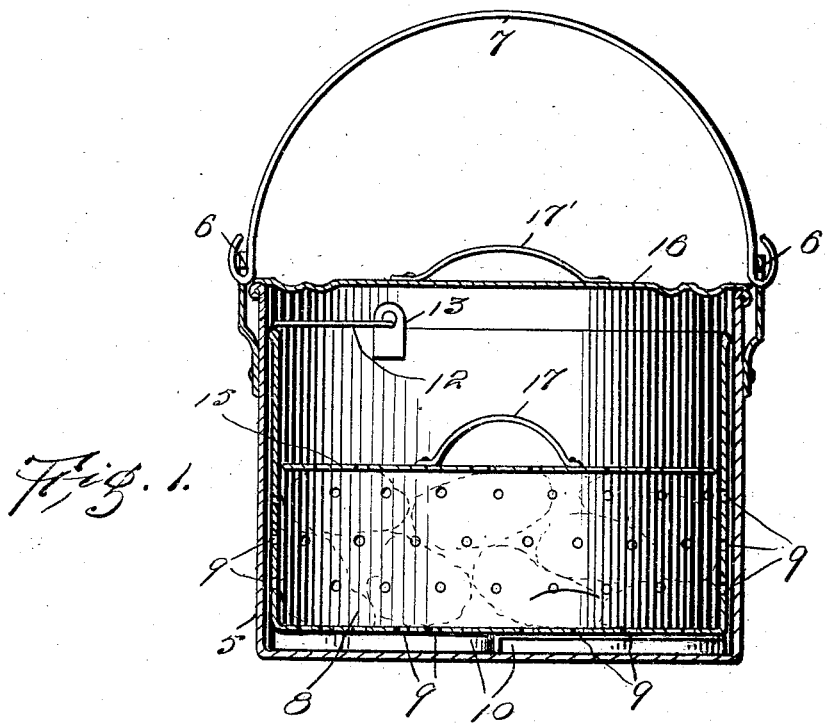
Figure 2:
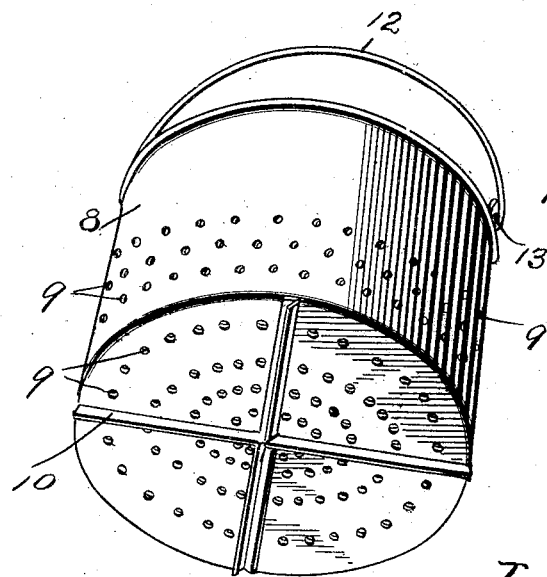

In the drawings forming a portion of this specification, in which like numerals of reference indicate similar parts in both views, Figure 1 is a vertical section through a kettle embodying the present invention. Fig. 2 is a bottom perspective view of the inner removable receptacle for the reception of the food to be cooked.

Referring now to the drawings, the present kettle comprises a main body portion 5 in the form of an ordinary pot or kettle having at diametrically opposite points of its upper edge the ears 6, with which are engaged the hooked ends of a bail 7. Within the body portion 5 is placed an inner removable receptacle 8, having the same general shape as the body portion 5 and having its bottom and the lower portions of its sides perforated, as shown at 9. The exterior diameter of the inner receptacle is somewhat less than the interior diameter of the pot or kettle, so that it lies in spaced relation to the walls of the kettle at its sides, the perforated bottom of the inner receptacle being supported above the bottom of the body portion 5 by means of the angle-bars 10, which are secured to the under face of the bottom of the inner receptacle diametrically of the latter, one side of each bar being secured against the inner receptacle, while the other side depends therefrom at a right angle. These depending portions of the angle-bars form scrapers, the lower edges of which rest upon the bottom of the body 5, and by rotating the inner receptacle in the body 5 the blades are caused to scrape the bottom of the body and remove any matter that would tend to bake or scorch onto the bottom. To facilitate rotation of the inner receptacle, as also application and removal of it, it is provided with a handle or bail 12, which is connected to the ears 13 at diametrically opposite points of its lower edge.

In the use of the utensil, as in preserving, the materials to be preserved are placed within the inner receptacle, so that the liquid that may come from it, as also that which may be added, will drain into the interspace between the inner receptacle and the body, so that in the cooking operation this liquid will steam, and being practically free from solid matter its tendency to scorch or burn onto the outer body portion will be reduced to a minimum. It also forms a liquid-jacket for the inner receptacle containing the solid matter, and thus prevents burning or scorching the latter.

A cover for the material within the inner receptacle is provided, and consists of a disk 15, which is perforated and at the center of which is provided a handle 17. This disk is sufficiently tight in the inner receptacle to prevent solid matter from rising to the edges thereof and at the same time is sufficiently loose to permit of easy movement. A lid or cover 16 is provided also for the outer or body portion 5 of the utensil and has a handle 17'.

The present utensil is not only valuable for use in preserving, but also in the cooking of vegetables and for other purposes where it is desired that the bodies be not broken.

In practice modifications of the specific construction shown may be made and any suitable materials and proportions may be used for the various parts without departing from the spirit of the invention.

The disk 15 is to be sufficiently heavy to prevent floating or rising of solid matter.

What is claimed is—

1. A cooking utensil comprising an outer receptacle and an inner receptacle removable from the outer receptacle and adapted to lie with its walls in spaced relation to those of the receptacle, the lower portions of the walls of the inner receptacle and the bottom thereof being perforated, and scraping-blades disposed diametrically of the under side of the inner receptacle and extending continuously from edge to edge thereof, said scraping-blades being adapted to rest upon the bottom of the outer receptacle and support the inner receptacle.

2. A cooking utensil comprising an outer receptacle and an inner receptacle removable therefrom and adapted to lie with its walls in spaced relation to those of the outer receptacle, the lower portions of the walls of the inner receptacle and the bottom thereof being perforated, scraping-blades secured diametrically of the under side of the inner receptacle and extending from edge to edge thereof, said scraping-blades being adapted to rest upon the bottom of the receptacle and support the inner receptacle, a perforated disk removably fitted in the inner receptacle and a cover for the outer receptacle.

In testimony whereof I affix my signature in presence of two witnesses.

LILLIE J. ALVORD.

Witnesses:
JOSEPHINE WINDER,
HANNAH QUINBY.